(No Model.)

L. C. NORTH & F. STAKE.
WATERING TROUGH.

No. 564,635. Patented July 28, 1896.

Witnesses
John J. Minie
Leon G. Martin

Inventors
Loyal C. North,
Frank Stake.
by David H. Mead
Attorney

UNITED STATES PATENT OFFICE.

LOYAL C. NORTH AND FRANK STAKE, OF JEFFERSON, IOWA, ASSIGNORS OF ONE-THIRD TO JOHN WHERRY, OF SAME PLACE.

WATERING-TROUGH.

SPECIFICATION forming part of Letters Patent No. 564,635, dated July 28, 1896.

Application filed July 25, 1894. Serial No. 518,562. (No model.)

*To all whom it may concern:*

Be it known that we, LOYAL C. NORTH and FRANK STAKE, citizens of the United States, residing at Jefferson, in the county of Greene and State of Iowa, have invented certain new and useful Improvements in Watering-Troughs; and we do hereby declare the following to be a full, clear, and exact description of the invention, such as will enable others skilled in the art to which it appertains to make and use the same.

This invention relates to watering-troughs for animals; and it relates particularly to watering-troughs designed for use in watering small animals, such as hogs, sheep, and the like.

The object of the invention is to produce a watering-trough of the kind specified capable of being attached to a barrel, tank, or the like, and to be of such construction as to maintain a uniform level of water in the trough independent of the quantity of water in the supply barrel or tank and independent of the pressure of such water.

A further object of the invention is to produce a watering-trough of the kind referred to provided with an automatic valve so arranged that the valve will be protected and the clogging of the same will be prevented.

With these objects in view the invention consists of a water-trough comprising a suitable vessel for holding a supply of water, a trough formed or provided with a neck-piece having a shoulder formed thereon adapted to set against the outer surface of the supply vessel, a screw-threaded portion extending beyond the shoulder, a threaded nut on the threaded portion of the neck to hold the trough clamped to the supply vessel, a contracted water-passage in the outer portion of the neck and a larger passage in the interior portion thereof, a valve seated in the larger portion of the neck, a float in the trough having a stem fulcrumed to the valve, and a screen in the neck midway between the valve and the inner end of the neck.

Further, the invention consists of other novel details of construction whereby the object of the invention is attained.

The invention is illustrated in the accompanying drawings, in which—

Figure 1:
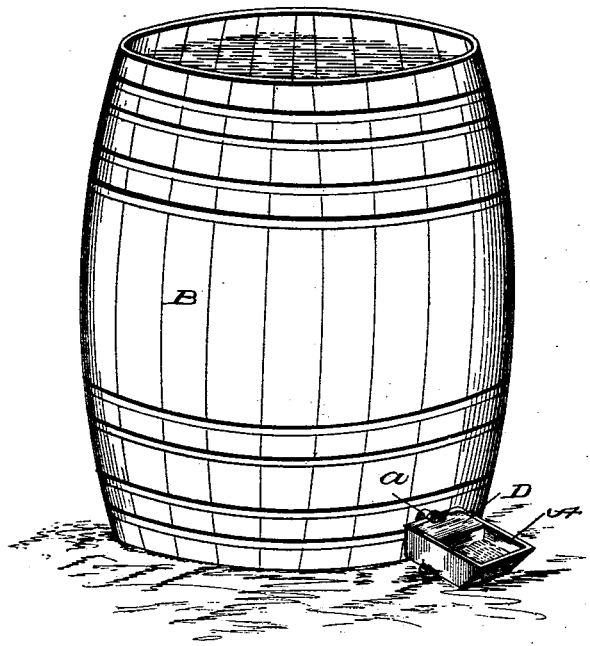
Figure 2:
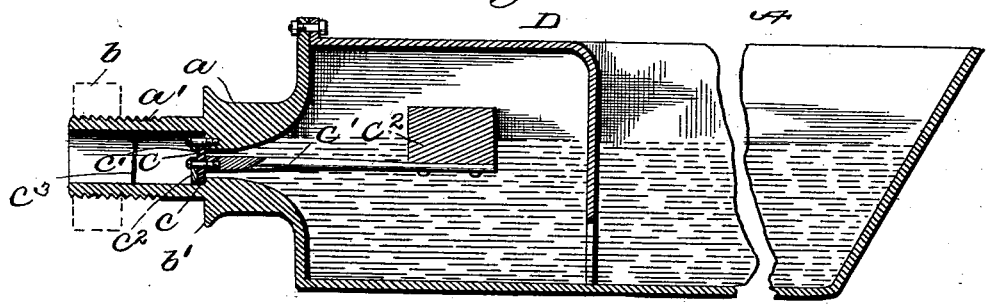
Figure 3:
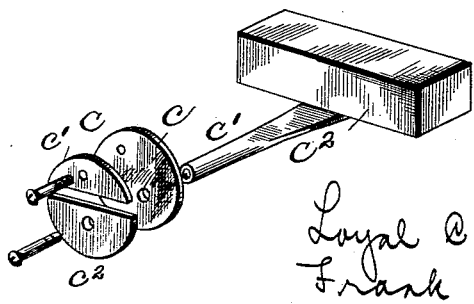

Figure 1 is a perspective view of a watering-trough made in accordance with our invention, the same being shown attached to a barrel. Fig. 2 is a longitudinal vertical section of the trough, and Fig. 3 is a detail view of the float and the parts connected therewith.

In the drawings, A represents the main portion of the trough, which is preferably of metal properly painted or otherwise covered or protected to prevent corrosion, though it may be made of wood, annealed glass, or the like, as desired. Projecting from one end of the main portion A is a neck $a$, having a passage through it for the inlet of water. The neck is designed to be attached to a barrel, tank, or the like B, containing water, and a convenient way of attaching the neck is by providing the end $a'$ of the neck, which projects through the barrel or the like, with a screw-thread. Upon this screw-threaded portion is placed an internally-screw-threaded ring $b$, which bears against the inner face of the barrel or the like. The outer face of the barrel or the like bears against the shoulder $b'$ on the neck $a$.

Arranged in the neck $a$ is a valve C, by which the inlet of water through the neck to the trough A is regulated. The present form of valve consists of a flexible disk $c$, retained in place by a small plate $c'$, and a plate $c^2$, designed to be forced against the flexible disk to cause the same to close the opening in the neck.

Projecting through the flexible disk $c$, and rigidly attached to the plate $c^2$, is a valve-rod C'. That portion of the neck at which the valve is placed is of somewhat smaller diameter than the remainder of the neck, and it is preferably composed of Babbitt metal or other suitable metal not liable to corrosion, in order that there may be no interference with the action of the valve. In order to prevent the entrance of foreign matter into the valve, which might result in clogging the same, a sieve or strainer $c^3$ is arranged between the barrel or tank and the valve.

The valve-rod C', which is fulcrumed on the outer end of the reduced portion of the neck, is provided at its outer end with a float $C^2$, arranged to move freely up and down in the rear end of the trough A. When the float is at the limit of its upward movement, the plate $c^2$ is in a position to press the flexible disk $c$ tightly over the opening in the neck and thus entirely stop the flow of the water. The downward movement of the float results in freeing the flexible disk and in opening the passage in the neck. The lower the position assumed by the float the larger the opening in the neck for the inlet of water. By this arrangement it will be seen that the level of the water in the trough will be maintained automatically, the water being admitted in quantities corresponding to those which are taken from the trough.

Arranged over the float $C^2$, in the inner end of the trough, is a shield or guard D, attached to the trough in any suitable way, and provided in its lower end with a series of openings or perforations for the passage of water. By the use of the shield or guard interference with the action of the float by an animal will be prevented, and accumulation liable to interfere with the movement of the float will be prevented.

Having thus described our invention, what we claim as new, and desire to secure by Letters Patent, is—

1. The combination with a suitable vessel for holding a supply of water, of a watering-trough comprising a trough formed or provided with a neck-piece having a shoulder formed thereon and adapted to set against the outer surface of the supply vessel, a screw-threaded portion extended beyond the shoulder, a threaded nut on the threaded portion of the neck to hold the trough clamped to the supply vessel, a contracted water-passage in the outer portion of the neck and a larger passage in the interior portion thereof, a valve seated in the larger portion of the neck, a float in the trough having a stem fulcrumed to the valve, and a screen in the neck midway between the valve and the inner end of the neck, substantially as and for the purpose specified.

2. The combination with a suitable vessel for holding a supply of water, of a watering-trough comprising a trough formed or provided with a neck-piece having a shoulder formed thereon and adapted to set against the outer surface of the supply vessel, a screw-threaded portion extended beyond the shoulder, a threaded nut on the threaded portion of the neck to hold the trough clamped to the supply vessel, a contracted water-passage in the outer portion of the neck and a larger passage in the interior portion thereof, a valve seated in the larger portion of the neck, a float in the trough having a stem fulcrumed to the valve, a screen in the neck midway between the valve and a shield D attached to the trough over the float and provided in its lower end with a series of openings for the passage of the water, substantially as and for the purpose specified.

In testimony whereof we affix our signatures in presence of two witnesses.

LOYAL C. NORTH.
FRANK STAKE.

Witnesses:
G. B. McCULLY,
W. S. McCULLY.